US005521467A

United States Patent [19]

Statnic et al.

[11] Patent Number: 5,521,467

[45] Date of Patent: May 28, 1996

[54] HIGH POWER FACTOR, HIGH-FREQUENCY OPERATING CIRCUIT FOR A LOW-PRESSURE DISCHARGE LAMP

[75] Inventors: Eugen Statnic, Munich; Gunther Loehmann, Wangen, both of Germany

[73] Assignee: Patent-Treuhand-Gesellschaft f. elektrische Gluehlampen mbH, Munich, Germany

[21] Appl. No.: 389,179

[22] Filed: Feb. 15, 1995

[30] Foreign Application Priority Data

Mar. 25, 1994 [DE] Germany .......................... 44 10 492.8

[51] Int. Cl.$^{6}$ .......................... H05B 37/02; H05B 41/29; H02M 1/12

[52] U.S. Cl. .................................. 315/247; 315/DIG. 7; 315/307; 315/244; 363/39; 363/47

[58] Field of Search .................................. 315/209 R, 94, 315/291, 224, 307, DIG. 7, 247, 244; 363/47, 48, 89, 61, 39, 40, 34, 37, 44, 45, 46

[56] References Cited

U.S. PATENT DOCUMENTS

| | | | |
|---|---|---|---|
| 3,753,037 | 8/1973 | Kaneda et al. | 315/99 |
| 4,438,372 | 3/1984 | Zuchtriegel | 315/224 |
| 4,647,817 | 3/1987 | Fahnrich et al. | 315/104 |
| 4,710,682 | 12/1987 | Zuchtriegel | 315/224 |
| 4,808,887 | 2/1989 | Fahnrich et al. | 315/247 |
| 4,949,013 | 8/1990 | Zuchtriegel | 315/106 |
| 4,959,591 | 9/1990 | Hirschmann | 315/209 R |
| 4,996,462 | 2/1991 | Krummel | 315/209 R |
| 5,008,597 | 4/1991 | Zuchtriegel | 315/209 R |
| 5,113,337 | 5/1992 | Steigerwald | 363/98 |
| 5,353,213 | 10/1994 | Paulik et al. | 363/19 |
| 5,396,153 | 3/1995 | Shackle | 315/247 |
| 5,412,287 | 5/1995 | Shackle | 315/247 |

FOREIGN PATENT DOCUMENTS

| | | |
|---|---|---|
| 0372303 | 11/1989 | European Pat. Off. . |
| 2115627 | 9/1983 | United Kingdom . |
| WO91/02400 | 2/1991 | WIPO . |
| WO92/04808 | 3/1992 | WIPO . |

OTHER PUBLICATIONS

The book, "Schaltnetzteile" (Network Components) by W. Hirschmann/ A. Hauenstein, Pub. by Siemens AG, 1990 Edition, p. 63.

*Primary Examiner*—Robert Pascal
*Assistant Examiner*—Arnold Kinkead
*Attorney, Agent, or Firm*—Frishauf, Holtz, Goodman, Langer & Chick

[57] ABSTRACT

To insure high power factor for the operating circuit of a low-pressure discharge lamp, especially of miniature fluorescent lamps, a high-frequency active rectifier bridge (D1–D4) is provided which interrupts charging of a smoothing capacitor (C2), which smoothing capacitor supplies an inverter circuit (WR) in the switching rhythm of the inverter. A storage choke or inductance (L1), a negative feedback capacitor (CG) and an auxiliary capacitor (CS) are coupled to the high-frequency rectifier bridge (D1–D4) which, together with the inductance insure an approximately sinusoidal current being taken from a power network, with a power factor of 0.98 or higher. Preferably, the circuit includes voltage dividers (R8, R9, R11; R15, R16, R17) which are coupled to a voltage sensitive trigger circuit (DI, TH) to turn OFF alternate switching of transistors (T1, T2) of the inverter (WR) in case excess supply voltage or operating voltages of the lamp are sensed.

10 Claims, 2 Drawing Sheets

HIGH POWER FACTOR, HIGH-FREQUENCY OPERATING CIRCUIT FOR A LOW-PRESSURE DISCHARGE LAMP

Reference to related patents, the disclosures of which are hereby incorporated by reference, assigned to the assignee of the present application:

U.S. Pat. No. 4,647,817, Fahnrich, et al.
U.S. Pat. No. 4,710,682, Zuchtriegel
U.S. Pat. No. 4,808,887, Fahnrich, et al.
U.S. Pat. No. 4,949,013, Zuchtriegel
U.S. Pat. No. 5,008,597, Zuchtriegel.

Reference to related patent, the disclosure of which is hereby incorporated by reference:

U.S. Pat. No. 3,753,037, Kaneda, et al.

Reference to related publication:

The book, "Schaltnetzteile" ("Network Components") by W. Hirschmann/A. Hauenstein, Pub. by Siemens AG, 1990 Edition, page 63.

FIELD OF THE INVENTION

The present invention relates to an operating circuit for a low-pressure discharge lamp, typically a compact fluorescent lamp, or a low power fluorescent lamp having a discharge tube in the order of about 1 cm diameter, or even less, and in which the load placed on an alternating current supply network has a high power factor.

BACKGROUND

Circuit arrangements for high frequency-operation of low-pressure discharge lamps are known and the referenced Fahnrich and Zuchtriegel patents disclose various circuits of this type. Operating discharge lamps, typically fluorescent lamps, with high-frequency supply, permits substantial improvements in the operating condition of the lamps, for example, better ignition, less flicker, and higher light output when compared with operation of the lamps directly from a power network. Additionally, the physical dimensions of auxiliary or accessory or ballast can be substantially reduced. Such operating circuits, however, require more complex networks and circuits, particularly in order to insure that there will be sufficient suppression of radio interference noise. The circuits should be so arranged that the current to be supplied from the power network will be as close to sinusoidal as possible, with the highest possible power factor, preferably, a power factor of one or as close to it as possible.

The referenced U.S. Pat. No. 5,008,597, Zuchtriegel, the disclosure of which is hereby incorporated by reference, assigned to the assignee of the present application, describes a suitable circuit for operation of a fluorescent lamp. This circuit uses a half bridge inverter or oscillator, having two alternatingly switching transistors. The center terminal between the two transistors is coupled to a series resonance circuit, formed of a resonance inductance, a coupling capacitor, and resonance capacity. The low-pressure discharge lamp is integrated into the series resonance circuit. The patent further discloses an active harmonic filter which insures that the power supplied will have effectively sinusoidal wave shape, conforming to standards by the International Electrotechnical Commission (IEC). The harmonic filter is formed by four diodes, connected similarly to a bridge rectifier, and integrated-in the circuit. The diodes are coupled in dc forward conductive direction between the dc output of a network power supply rectifier and a positive terminal of a smoothing capacitor for supplying the inverter and forming an output from the rectifier. The four diodes of the harmonic filter interrupt transport of charge to the smoothing capacitor in synchronism with the switching of the inverter transistors. Switching of the diodes is controlled by the diodes themselves, connected in series with respect to each other, by terminals connected to the center tap between the serially connected diodes. The center tap or connection of a first diode pair is connected directly to the center tap of the half bridge inverter through a pumping or auxiliary capacitor and, further, connected through a further auxiliary or pumping capacitor between the resonance inductance and the coupling capacitor to a junction in the series resonance circuit. The center tap or connection of the second diode pair is connected through a dc blocking capacitor and an inductance to a junction or terminal in the series resonance circuit.

This network functions well and draws approximately sinusoidal current from the network with a network power factor about or somewhat larger than 0.9.

THE INVENTION

It is an object to provide a circuit to operate a high pressure discharge lamp and more particularly a fluorescent lamp, and especially a thin tube or compact fluorescent lamp drawing network current which is even more closely sinusoidal than heretofore possible and which has a further improved power factor of the energy drawn; and which, further, is also suitable to operate low-pressure discharge lamps with higher operating voltages than heretofore.

Briefly, the circuit uses a storage inductance which is connected between a terminal of a first polarity, typically, the positive terminal, of the power rectifier rectifying network power for supply of an inverter, and the terminal of like polarity of two diodes of a high-frequency rectifying bridge which forms part of the harmonic filter. A negative feedback capacitor is coupled to the midpoint of one branch of the bridge rectifier and the first electrode of the lamp. An auxiliary or pumping capacitor is coupled to the midpoint of the other branch of the diode bridge rectifier and a second electrode of the lamp.

The circuit uses an inverter, as well known, with a LC output circuit connected thereto, which, in turn, is connected to the low-pressure discharge lamp. The inverter is supplied with direct current derived from a network supply of, for example, 110/60 Hz or 220/50 Hz alternating current power supply. The ac power supply is first connected to a high-frequency filter which, in turn, is connected to a rectifier, the output of which is coupled to a smoothing capacitor. The output from the smoothing capacitor basically forms the power supply for the inverter. A high-frequency bridge rectifier is coupled between the dc output of the rectifier and the positive terminal of the smoothing capacitor. The high-frequency bridge rectifier is formed of two parallel arranged series connection of two diodes each, connected in dc forward conducting polarity.

In accordance with the invention, a storage inductance is connected between the positive terminal of the dc output of the network supply rectifier and the input to the high-frequency diode bridge rectifier. The negative feedback capacitor is connected between a first pair of serially connected diodes and a first lamp electrode. The center connection, or center tap, between the second pair of serially connected diodes is connected to a second lamp electrode and to the auxiliary capacitor and then to the negative terminal of the smoothing capacitor forming the output from the power rectifier.

The connection, in accordance with the present invention, of the storage inductance and of the bridge diode rectifier results in a current draw from the power network which is effectively sinusoidal, meeting all requirements of the IEC provisions and has a power factor of over 0.98. Connecting the storage inductance as described to the input of the high-frequency bridge rectifier has the additional effect of voltage enhancement so that the circuit in accordance with the present invention can operate low-pressure discharge lamps with comparatively high operating voltage, suitable, for example, for miniature fluorescent lamps and for fluorescent lamps which have a high increase in running or operating voltage as they age.

In accordance with the preferred feature of the invention, a capacitor is connected in parallel to the dc output of the network rectifier and, further, so dimensioned that it forms a low pass filter together with the storage inductance. This low pass filter additionally attenuates high-frequency voltage components transferred to the power network at the connection of the circuit therewith.

In accordance with another preferred embodiment, the preheatable filaments of the low-pressure discharge lamps are so connected with the LC output circuit of the inverter, that after the lamp has ignited or fired, they are no longer connected to conduct heat or current therethrough, which would load the filaments in addition to the current through the discharge path. This makes the circuit particularly suitable for use with miniature fluorescent lamps, the electrodes of which are especially highly thermally loaded during operation. Such miniature discharge lamps, for example, of the T2 type, have a much higher current density in their filaments than T8 or T10 fluorescent lamps.

DRAWINGS

FIG. 1 is a highly schematic diagram of the circuit in accordance with the present invention, and FIG. 2 is a detailed circuit diagram of a preferred embodiment.

DETAILED DESCRIPTION

Figure 1:
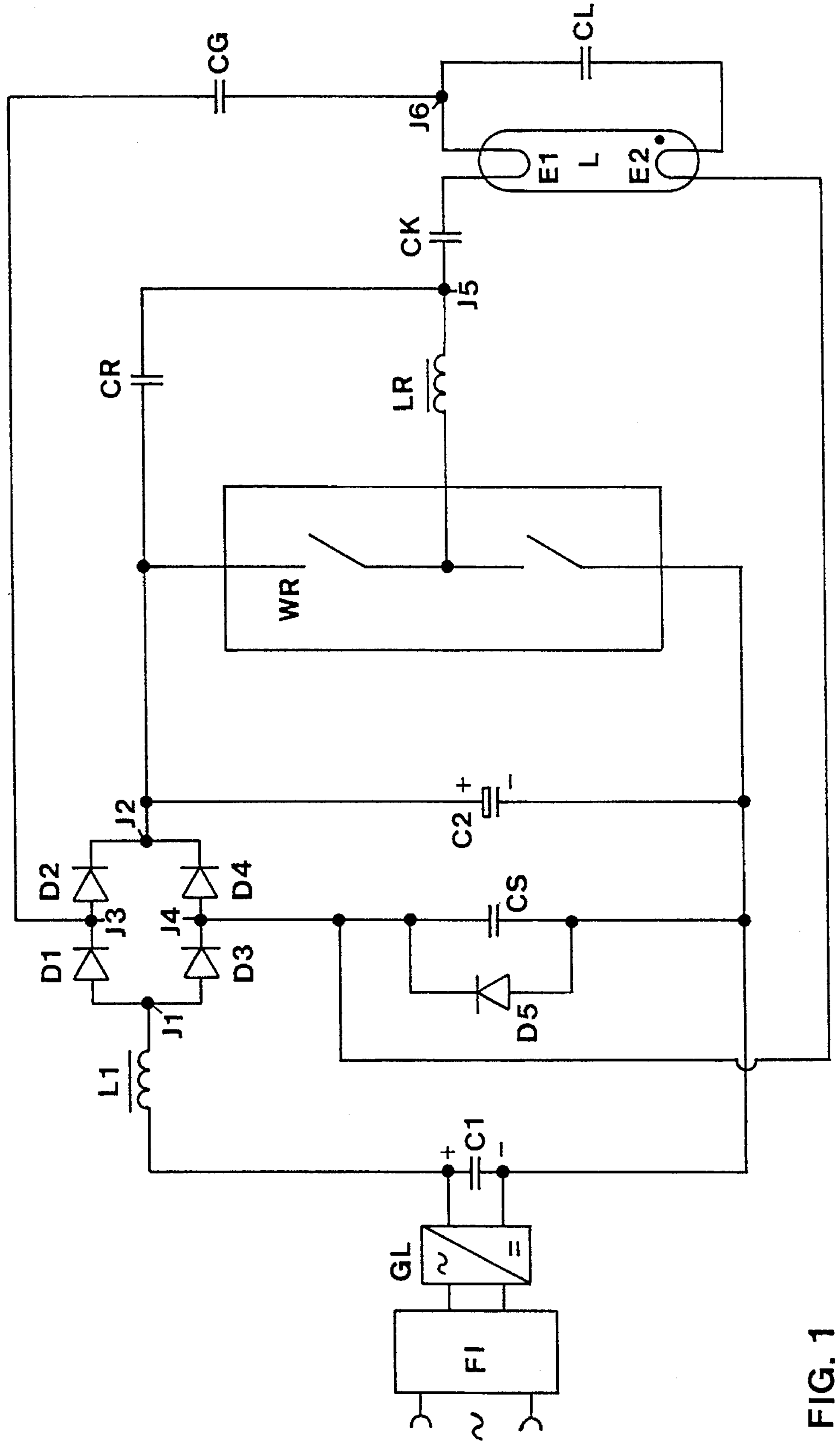

Referring first to FIG. 1, which is a highly schematic block diagram illustrating the circuit in accordance with the present invention. A radio noise interference filter FI is connected to a network power supply, shown only schematically. The filter FI is connected to a standard rectifier GL, for example, a bridge rectifier, the dc output of which is connected to a smoothing capacitor C1, in parallel across the output. The circuit also includes an inverter WR having a LC output circuit, formed by resonance inductance LR, a resonance capacity CR, a coupling capacitor CK, and a low-pressure discharge lamp L. The input to the inverter WR is connected across a smoothing capacitor C2, which, in turn, is connected in parallel to the dc output capacitor C1 and the rectifier GL.

In accordance with the feature of the invention, the positive terminal of the network rectifier GL is connected through a storage inductance L1 to input terminal J1 of a rectifier bridge formed by four diodes D1, D2, D3, D4. The output terminal J2 of the rectifier bridge is connected to the positive terminal of capacitor C2 and, hence, with an input to the inverter WR. It is, additionally, connected to the resonance capacitor CR and then to a junction J5 in the LC output circuit from the inverter WR. A negative feedback capacitor CG is connected to a junction J6 between one terminal of a first filament E1 of a fluorescent lamp L, and a heater circuit capacitor CL. An auxiliary capacitor CS has its negative terminal connected directly to the other electrode E2 of the lamp. A diode D5 is connected across the auxiliary or clamping capacitor CS.

OPERATION

The charge on the smoothing capacitor C2 is interrupted by the high-frequency rectifier bridge D1–D4 in the switching rhythm of the inverter WR. Control of the high-frequency rectifier bridge is obtained by the connection to the junctions J3 and J4 between the diodes D1, D2, and the diodes D3, D4. The voltage at junction J3 is determined by the voltage drop at the negative feedback capacitor CG, which is connected to the junction J3 between the diodes D1, D2, and to junction J6 in the electrode heat or filament heating circuit. The electrode filament heating circuit is formed by the filaments E1, E2 and the capacitor CL.

The junction J4 between the diodes D3, D4 is connected directly with the electrode E2 and, further, to the auxiliary capacitor CS, the other terminal of which is connected to the negative terminal of the capacitor C2. The voltage drop on the auxiliary capacitor CS is proportional to lamp current and determines the voltage at the junction J4 between the diodes D3, D4 and thus controls the blocking behavior of the pair of diodes, D3, D4. The diode D5 connected in parallel to the auxiliary capacitor CS clamps the negative portions of the voltage across the auxiliary capacitor CS to the null or zero line, that is, to the negative terminal of the smoothing capacitor C2.

As long as the instantaneous value of the voltage from the network is lower than the voltage at the negative feedback capacitor CG or, on the auxiliary capacitor CS, respectively, diodes D1 and D3 are in blocked condition, and diodes D2, D4 are conductive. Thus, the smoothing capacitor C2 is not charged from the network rectifier GL. When the instantaneous value of voltage of the network is above the voltages on the negative feedback capacitor CG, and the auxiliary or clamping capacitor CS, diode branches D1–D2 and D2–D3, respectively, will be conductive and smoothing capacitor C2 is supplied with charge through the network rectifier GL.

The coupling capacitor CK is charged and recharged in switching synchronism with the inverter WR. The charged state of the capacitors CG and CS changes similarly, so that by suitably dimensioning components of the LC output circuit and of the capacitors CG, CS and the storage inductance L1, it is possible to so control the high-frequency rectifier bridge that the charge of the smoothing capacitor C2 is interrupted in the switching rhythm of the inverter WR. The storage inductance L1 has an enhancing effect, since it supplies energy to the smoothing capacitor C2 during the pass or conductive phase of the high-frequency rectifier bridge D1–D4 from the energy stored in the magnetic field of the inductance L1 which, preferably, is constructed as a cored element or choke. Additionally, the inductance L1, together with the network rectifier capacitor C1, connected parallel to the output of the network rectifier GL, forms a low pass filter which further attenuates high-frequency voltage components.

Figure 2:
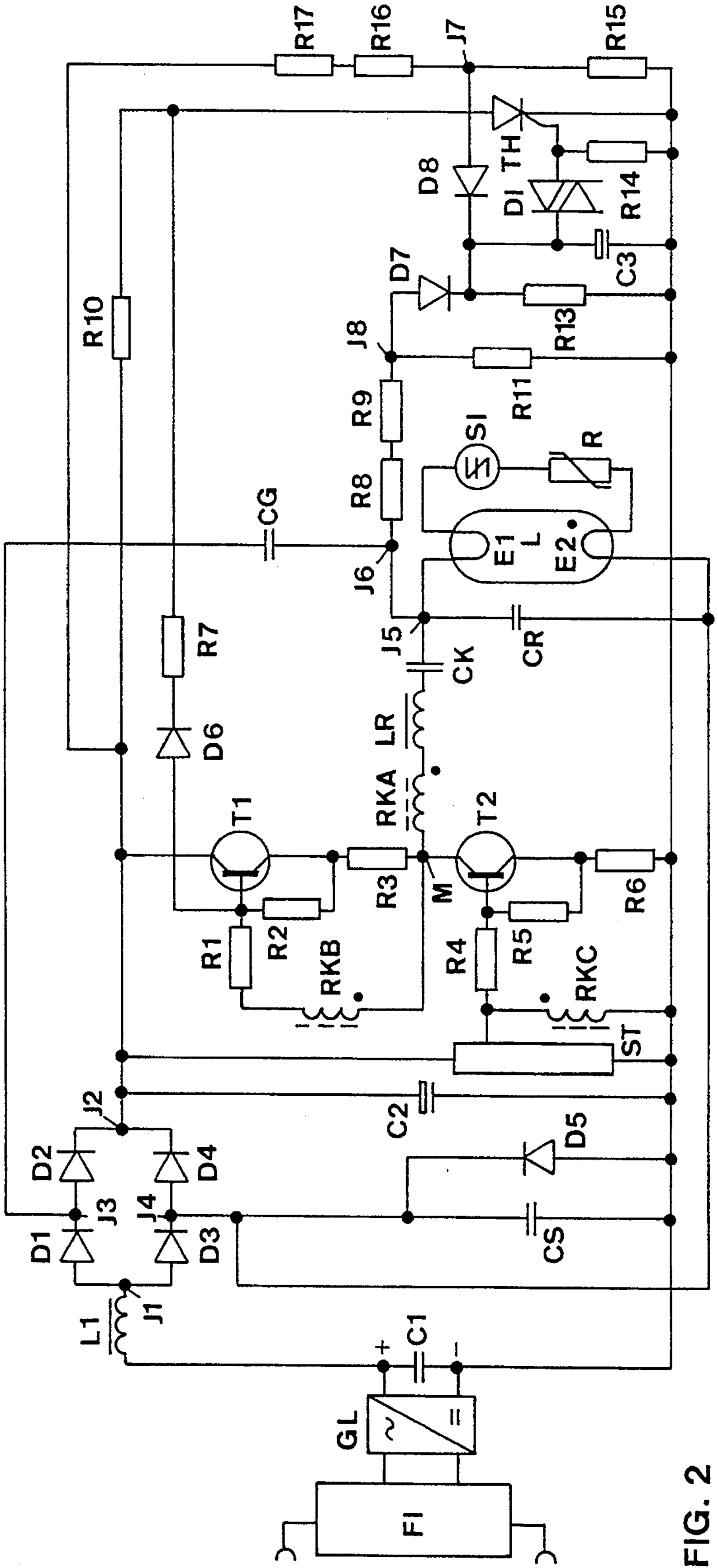

Referring now to FIG. 2, which shows a detailed circuit diagram of a particular preferred embodiment of the circuit in accordance with the present invention.

The main component of the circuit is a self-oscillating half bridge inverter, operating with feedback current, having two alternatingly switching transistors T1, T2. The inverter receives its supply voltage from a smoothing capacitor C2 connected in parallel to its input. Smoothing capacitor C2 is supplied indirectly from a power supply through the radio interference filter FI, a rectifier GL, a capacitor C1 connected in parallel to the dc output of the rectifier, and a high-frequency rectifier bridge formed by the diodes D1–D4. The center point, or junction M, between the transistors T1, T2, is connected to a LC output circuit, formed as a series resonance circuit and including a resonance inductance LR, a coupling capacitor CK, and a resonance capacity formed by capacitor CR. The series resonance circuit also includes the primary turn RKA of a toroidal core transformer.

The lamp L for which the circuit is intended is a T2 miniature fluorescent lamp of 13 watt nominal rating. T2 means that the lamp L has a diameter measured transversely to the discharge path of 2/8ths inch (about 7 mm), in accordance with standard fluorescent lamp nomenclature. The electrodes E1, E2 are formed as coiled filaments and one terminal of each electrode E1, E2 is connected to a SIDAC SI serially connected to a negative temperature co-efficient (NTC) resistor or cold-conductor R. The filaments E1, E2, the SIDAC SI and the NTC form a heater circuit connected parallel to the resonance capacitor CR, which permits preheating of the filaments E1, E2 before the lamp fires or ignites.

After the lamp has fired or ignited, the SIDAC SI interrupts the heating circuit so that the NTC resistor R is removed from the LC output circuit of the inverter. The discharge path L is in parallel to the resonance capacitor CR and in parallel to the series circuit formed by the SIDAC SI and the NTC resistor R. The series resonance circuit of the half bridge rectifier T1, T2 comprising the transformer turn RKA, inductance LR, capacitor CK, and capacitor CR, is closed by the clamping or auxiliary capacitor CS. One terminal of capacitor CS is connected to the resonance capacitor CR and to the first terminal of the lamp electrode E2. The other terminal of the capacitor CS is connected to the negative terminal of the smoothing capacitor C2 and to the negative output of the rectifier GL. The electrode filaments E1, E2 of the lamp L thus are not integrated in the series resonance circuit and, after firing, only the discharge current between the electrodes E1, E2 of the lamp will flow therethrough.

The primary turn RKA of the toroidal core transformer controls the switching condition of the transistors T1, T2, by controlling the base circuit of the respective transistors. The base circuits include secondary turns RKB, RKC, respectively, also wound on the same core as the primary RKA, and the base resistors R1, R4. The emitter resistors R3, R6, connected parallel to the base-emitter resistors R2, R5 are further provided in the inverter circuit. The inverter circuit additionally has a starting circuit ST shown only schematically, which triggers starting of the inverter.

A detailed description of the operation of such a half bridge inverter, including the starting circuit, is found in the book, "Schaltnetzteile" ("Network Components") by W. Hirschmann/A. Hauenstein, Pub. by Siemens AG, 1990 Edition, page 63, and, for example, also in the referenced U.S. Pat. No. 5,008,997, Zuchtriegel. Resistors R2 and R5 only improve the switching behavior of transistors T1, T2, to insure rapid dissipation of charge carriers from the space charge zone of the base-emitter boundary layer.

In accordance with the major feature of the present invention, the high-frequency rectifier bridge formed by the diodes D1–D4 is connected into the circuit through the inductance L1. The diodes D1–D4 are connected in current passing polarity between the positive terminal of the network power rectifier GL and the positive terminal of the smoothing capacitor C2; see junctions J1, J4. Diodes D1 and D2, as well as diodes D3, D4 are serially connected, the diode pair D1, D2 being in parallel to the diode pair D3, D4. The anodes of the diodes D1, D3, at junction J1, are connected through the inductance L1 to the positive terminal of the network rectifier GL. Inductance L1 forms an inductive storage element, for example, a storage choke. The cathode terminals of the diodes D2, D4, connected together at junction J2, are connected to the positive terminal of the smoothing capacitor C2, and also to the collector of the transistor T1. The center terminal J3, between the diodes D1, D2, is connected through the negative feedback coupling capacitor CG to Junction J6 which, in this embodiment, is also connected to the junction J5 with the coupling capacitor CK and the resonance capacitor CR and to one terminal of the electrode filament E1. The center junction J4, between the diodes D3, D4, is directly connected to a junction coupled to the other terminal of the resonance capacitor CR and one terminal of the other filament E2. Further, the junction J4 is connected to a terminal of the auxiliary capacitor CS, the other terminal of which is connected to the negative terminal of the smoothing capacitor C2 and the negative terminal of the network power rectifier GL. The diode D5 is connected in parallel to the auxiliary capacitor CS. It clamps the negative portions of the voltage on the auxiliary capacitor CS to the negative terminal of the smoothing capacitor C2.

As above described, the high-frequency rectifier bridge formed by the diodes D1–D4 interrupts charging of the smoothing capacitor C2 in the switching rhythm of the half bridge rectifier formed by the transistors T1, T2 and associated circuitry. Elements having the same function and identical with those described in FIG. 1 and 2 have been given the same reference numerals.

In accordance with the feature of the invention, the circuit includes a protective turn-off circuit portion. This prevents destruction of the circuit in case of unusual and abnormal operating conditions, for example, due to a defective lamp, an aged lamp or abnormal operating states, and then turns off the inverter. The essential element of this safety turn-off circuit is a thyristor TH, the control electrode of which is controlled by a Diac DI. The thyristor TH is connected through an Ohmic holding resistor R10 with the collector of the transistor T1. The other main terminal of the thyristor TH is connected to the negative terminal of the smoothing capacitor C2. The control electrode of thyristor TH is connected through the Diac DI and an electrolytic capacitor C3 with the negative terminal of the smoothing capacitor C2. The base of transistor T1 is connected over a diode D6 and an Ohmic resistor R7 to the anode of the thyristor TH. Voltage divider resistors R15, R16, R17 are connected in parallel to the smoothing capacitor C2. The junction J7 between resistors R16 and R15 is connected through a diode D8 with the positive terminal of the electrolytic capacitor C3. The junctions J5, J6, respectively, between the feedback capacitor CG, the electrode filament E1, the coupling capacitor CK and the resonance capacity CR is connected to the negative terminal of the smoothing capacitor C2 through the resistors R8, R9 and R11. The junction J8 between the resistor R9 and R11 is further connected over diode D7 with the positive terminal of the electrolytic capacitor C3. An Ohmic resistor R13 is connected in parallel to the electrolytic capacitor C3. The control electrode of the thyristor TH is connected over the Diac DI to the positive terminal of capacitor C3 and, further, directly through resistor R14, to the negative terminal of smoothing capacitor C2.

Operation of protective turn-off circuit: The voltage divider R15, R16, R17 detects the voltage drop across the smoothing capacitor C2. If this drop exceeds a predetermined critical value, electrolytic capacitor C3 will be charged to a level through diode D8, which will meet or exceed the switch-over voltage of the Diac DI; the thyristor will become conductive, and the base of the transistor T1, thus, is connected to the negative terminal of smoothing capacitor C2 through diode D6 and resistor R7. Control signals, thus, are removed from transistor T1, so that the half bridge inverter will stop oscillating.

The operation of the lamp L is monitored by the voltage divider R8, R9, R11, which detects the ignition voltage and the operating or running voltage, respectively, of the miniature fluorescent lamp L. If the lamp L does not fire, or if the operating voltage becomes excessive, for example, due to aging of the lamp, electrolytic capacitor C3 is charged over diode D7 to the triggering voltage of the Diac DI, again, causing thyristor TH to become conductive and removing control voltage from the base of transistor T1. The resistor R13 and the electrolytic capacitor C3 form a timing circuit which defines a timing constant long enough so that the thyristor TH will not be controlled to conduction during the ignition phase of the lamp L.

Table 1, forming a part of this application, shows suitable dimensions for the example described in connection with FIG. 2.

TABLE

| | |
|---|---|
| R1, R4 | 10 Ω |
| R2, R5 | 82 Ω |
| R3, R6 | 0.56 Ω |
| R7 | 100 Ω |
| R8, R9, R16, R17 | 500 kΩ |
| R10 | 68 kΩ |
| R11 | 82 kΩ |
| R13 | 1 MΩ |
| R14 | 1 kΩ |
| R15 | 47 kΩ |
| C1 | 47 nF |
| C2 | 4.7 μF |
| C3 | 2.2 μF |
| CS | 4.7 nF |
| CEC | 68 nF |
| CR | 2.2 nF |
| CG | 1 nF |
| L1 | 1.5 mH |
| LR | 4.5 mH |
| RKA:RKB:RKC | 7:2:2 turns |
| D1–D8 | RGL34J |
| T1, T2 | BUD 620 |
| TH | C106M |

The present invention is particularly suitable for fluorescent lamps having ratings of under 20 watts and, for example, of the T2 type or other similar lamps which have a high current density of current flow through the electrodes E1, E2. It is, of course, also suitable for other lamps, for example, compact fluorescent lamps which have thicker discharge vessels of the T3, T4 (3/8 4/8 inch diameter) type.

Operation of the SIDAC SI in a lamp operating circuit is described in detail in the referenced U.S. Pat. No. 3,753,037, Kaneda, et al.

Various changes and modifications may be made within the scope of the inventive concept.

We claim:

1. High power factor, high-frequency operating circuit for a low-pressure discharge lamp (L) having a radio noise interference filter (FI) adapted for connection to a power network;

a network power rectifier (GL) coupled to the filter (FI) and providing a dc output;

an inverter (WR) coupled to the dc output of the network power rectifier (GL), said inverter including a L-C output circuit (LR, CK, CL), said lamp (L) being connected into the L-C output circuit;

a smoothing capacitor (C2) coupled, in parallel, to the input of the inverter (WR);

an active high-frequency filter forming a high-frequency rectifying bridge including two parallel connected series circuits, each comprising two diodes (D1, D2; D3, D4) which are connected in dc forwardly conductive polarity between an output terminal of the network power rectifier (GL) and a terminal of the smoothing capacitor (C2), said series circuits forming a high frequency rectifying bridge, said operating circuit comprising, in accordance with the invention, a storage inductance (L1) connected between a terminal of a first polarity (+) of the power rectifier (GL) and the terminal of like polarity of two diodes (D1, D3) of the high-frequency rectifying bridge (D1, D2; D3, D4);

a negative feedback capacitor (CG) coupled to a midpoint (J3) of one branch (D1, D2) of the high frequency rectifying bridge (D1–D4) and a first electrode (E1) of the lamp (L);

an auxiliary capacitor (CS); and wherein one terminal of the auxiliary capacitor (CS) and a second electrode (E2) of the lamp are coupled to a midpoint (J4) of the other branch (D3, D4) of the high frequency rectifying bridge (D1–D4), the other terminal of said auxiliary capacitor (CS) being coupled to a terminal of polarity (–) opposite to said first polarity of said power rectifier (GL).

2. The operating circuit of claim 1, wherein said first polarity of the network power rectifier (GL) is of positive polarity.

3. The operating circuit of claim 1, further including a rectifier output capacitor (C1) connected in parallel across the dc output of the network power rectifier (GL).

4. The operating circuit of claim 1, wherein said low-pressure discharge lamp comprises a fluorescent lamp, and the electrodes (E1, E2) of the fluorescent lamp comprise preheatable electrode filaments.

5. The operating circuit of claim 1, wherein said inverter (WR) comprises a half bridge inverter including two alternately switching transistors (T1, T2), and said L-C output circuit comprises at least one resonance inductance (LR), a resonance capacity (CR) and a coupling capacitor (CK);

wherein said negative feedback capacitor is connected between said midpoint (J3) of one branch (D1, D2) of the high frequency rectifying bridge (D1–D4), and a first terminal of the first electrode (E1) of the lamp, said first terminal additionally being connected to one terminal of said resonance capacity (CR), the other terminal of which is connected to the midpoint (J4) of the other branch (D3, D4) of the high frequency rectifying bridge (D1–D4), said first terminal of the first electrode (E1) being further connected through the coupling capacitor (CK) and said resonance inductance (LR) to a mid-connection (M) between the switching transistors (T1, T2) of the inverter (WR);

the second electrode (E2) of the lamp having a first terminal, which first terminal is connected to the midpoint (J4) of the other branch (D3, D4) of the high frequency rectifying bridge (D1–D4); and wherein a filament heat circuit (SI, R) is provided, connected to the second terminals of the first electrode (E1) and of the second electrode (E2).

6. The operating circuit of the claim 1, further including a protective turn-off circuit, sensing abnormal operating or power supply conditions and turning said operating circuit OFF.

7. The operating circuit of claim 1, further including voltage sensing means (R15, R16, R17; D8, C3, DI) connected across a smoothing capacitor (C2), for sensing the voltage across said smoothing capacitor and providing a control signal when the sensed voltage exceeds a predetermined level;

and a turn-off circuit (TH, R14) connected to said inverter (WR) and turning OFF said inverter by suppressing oscillation thereof.

8. The operating circuit of claim 1, further including a voltage sensing circuit (R8, R9, R11; D7, C3) connected across said lamp (L) and sensing ignition and operating voltage, respectively, of the lamp; and a voltage responsive circuit (DI; TH) connected to said voltage sensing circuit and turning OFF said inverter (WR), if a sensed voltage exceeds a predetermined level by inhibiting oscillation of said inverter.

9. The operating circuit of claim 8, further including a timing circuit, for damping response of the voltage sensing circuit during the time of an ignition phase of the lamp.

10. The operating circuit of claim 1, further including a voltage sensing circuit (R15, R16, R17; D8, C3, DR) connected in parallel across said smoothing capacitor (C2) and controlling turn-OFF of the inverter (WR) in case of excess voltage across the smoothing capacitor.

* * * * *